Nov. 22, 1955  R. A. FINDLAY  2,724,731
SOLVENT EXTRACTION PROCESS
Filed Sept. 24, 1951
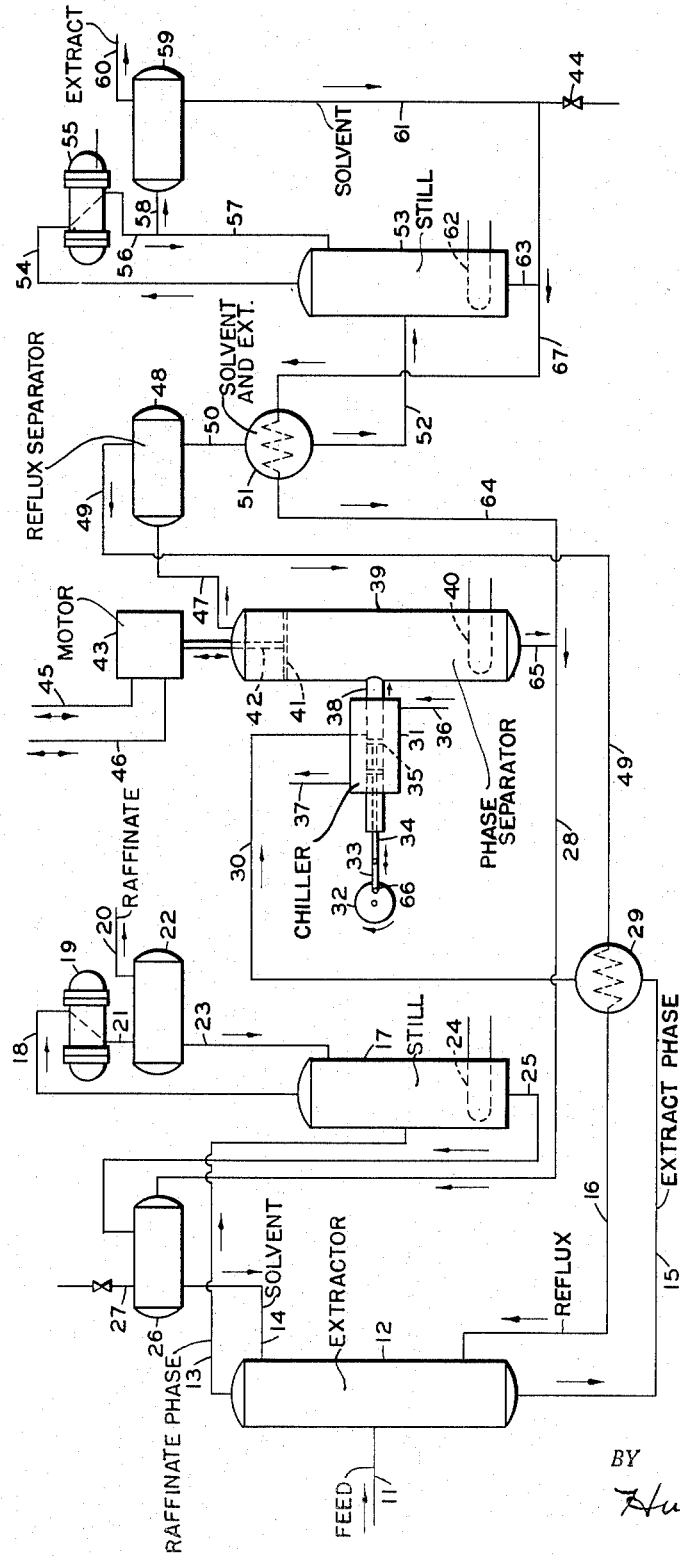
INVENTOR.
R. A. FINDLAY
BY
Hudson & Young
ATTORNEYS United States Patent Office 2,724,731
Patented Nov. 22, 1955

2,724,731

SOLVENT EXTRACTION PROCESS

Robert A. Findlay, Bartlesville, Okla., assignor to Phillips Petroleum Company, a corporation of Delaware Application September 24, 1951, Serial No. 247,967

13 Claims. (Cl. 260—666)

This invention relates to a solvent extraction operation. In one aspect it relates to a method for the production of reflux for refluxing a solvent extraction operation. In another aspect it relates to a method for the production of liquid reflux material for use in solvent extraction operation wherein the extract phase distillation load is minimized.

In solvent extraction operations wherein liquid reflux is produced and introduced into the extration zone this reflux is ordinarily a portion of the extract material product stream. In this type of operation all of the extract phase is distilled for the recovery of the solvent for recycling purposes and for the production of the extract product. While it is conventional to use a portion of the actual extract material as reflux it is not necessary to employ a material entirely free from solvent for refluxing purposes, such as that produced by distillation. The volume of extract phase is ordinarily relatively large since in usual operations the ratio of solvent to extract materials is quite large and considerable amounts of heat have to be utilized in separation of the solvent from the extract. It is considered advantageous to use some intermediate product of substantial purity for refluxing purposes in place of the fully purified extract product. If such a material is available in an extraction operation the cost of extract phase distillation is materially reduced because of the reduced heat load required for distilling smaller volumes of extract phase.

One object of my invention is to provide an improved solvent extraction process.

Another object of my invention is to provide a process for the production of reflux material for use in an extraction operation.

Another object of my invention is to provide a process for the production of a reflux material from a less expensive operation than that usually employed.

Still another object of my invention is to devise a process for the production of a reflux material sufficiently pure for extraction tower refluxing purposes without utilizing an extract still for its production.

Still other objects and advantages of my process will be realized upon reading the following disclosure which taken with the attached drawing forms a part of this specification.

The drawing represents diagrammatically one form of apparatus suitable for carrying out the process of my invention.

Referring now to the drawing, reference numeral 12 identifies a liquid-liquid extract column of conventional design. This extract column may be packed with any desired type of liquid-liquid contact promoting apparatus providing it promotes satisfactory contacting of the liquid phases undergoing treatment. A charge stock feed line 11 is provided at about a mid-point of the tower. Line 13 is for withdrawal of raffinate phase and passage to a raffinate phase distillation still 17. This still is provided with an overhead vapor withdrawal line 18 which contains condenser 19. Conduit 21 carries condensate from condenser 19 to an accumulator 22. Line 20 is for raffinate product removal while a line 23 is for return of a portion of the condensate to the still 17 as reflux. Still 17 is provided with a reboiler coil 24 and a bottoms drawoff line 25. A run tank 26 provided with a pressure relief line 27 is intended to serve as a run storage for solvent in the process. A line 14 leads from the bottom of this run tank 26 to the upper portion of the extract column 12 for introduction of solvent to the operation. A line 16 positioned at a point near the bottom of the vessel 12 is for introduction of liquid reflux produced according to my invention. A line 15 is provided at the bottom of the vessel 12 for withdrawal of extract phase. A heat exchanger 29 is provided for cooling material flowing from line 15 by material from a line 49. Cooled material from this exchanger flows on through a line 30 into a cooler or chiller 31. From this chiller material passes by way of a conduit 38 into a crystal purifier 39. This chiller 31 is actually considerably more than a mere cooling means, since it is provided with a piston 35 for transferring solid material produced in cooler 31 and remaining liquid material through line 38 into the purifier 39. Coolant for carrying out a crystallization operation in cooler 31 enters this apparatus through an inlet line 36 and exits therefrom by way of an outlet line 37.

To the piston 35 is attached a piston rod 34 which is pivoted to a pitman 33 which in turn is powered by a source of power 32. The pitman is pivoted by element 66 to the source of power 32 and by rotation of element 32 the piston 35 reciprocates to advance solid and liquid material in conduit 38 and to draw liquid material to be cooled in cooler 31 from line 30.

The crystal purifier 39 is provided with a heating coil 40 at a point near its bottom and a reciprocating porous piston 41 as illustrated. This reciprocating porous piston is attached to a piston rod 42 which in turn is powered by an apparatus 43 which contains a piston, not shown. This piston in power element 43 is reciprocated by the introduction of air pressure alternately through lines 45 and 46. In the operation of this power element 43, when air pressure is admitted thereto through line 45 the piston 41 is forced downward with air exhausting through line 46. In like manner when air pressure is admitted through line 46 the piston rises and air is exhausted through line 45. Attached to the bottom of the crystal purifier 39 is a line 65 for passage of material from the bottom of this separator by way of a line 28 into the run tank 26. To the top of this phase separator 39 is attached a line 47 for transfer of liquid to a liquid phase separator 48. The line 49 is connected to the top of this liquid phase separator and to the heat exchanger 29. Material passing from the separator 48 through line 49 passes through the tubes of the exchanger 29 and through line 16 into the lower portion of the extractor 12. A line 50 connected with the bottom of the liquid phase separator 48 is intended to conduct liquid therefrom to a heat exchanger 51 from which a line 52 extends on to a still 53. This still is provided with an overhead vapor withdrawal line 54 which is provided with a condenser 55. A line 56 leads from the condenser 55 for passage of condensate, a portion of which is passed through a line 57 into the still 53 as reflux and the remaining portion passes through a line 58 into an accumulator tank 59. This accumulator tank 59 also serves as a phase separator in which an extract product phase separates and is removed through a line 60 while material for recycling in the process is removed through lines 61 and 67 into the heat exchanger 51. In this line 67 the material from line 61 is mixed with the material from still 53 passing through line 63. This combined material is cooled somewhat in the exchanger 51 and this cooled combined material passes on through a line 64 with material added from the line 65 and the mixture is passed on through line 28 into the run tank 26. The still 53 is provided with a reboiler coil 62 for supplying heat for distillation.

The above mentioned crystal purifier 39, as applied to one step of my process, is fully described in a copending application by John A. Weedman, Serial No. 166,992, filed June 9, 1950.

I will explain the operation of this apparatus using as an example the separation of methylcyclohexane from admixture with n-heptane by a solvent consisting substantially of aqueous phenol, in which operation some relatively pure methylcyclohexane as an intermediate product is produced and recycled into the extraction operation for refluxing the extract column. In this operation, to each 100 parts by weight of charge stock containing equal parts by weight of n-heptane and methylcyclohexane is added about 1800 parts by weight of wet phenol. This wet or water-containing phenol may contain as much as from 5 to 15 per cent by weight of water, preferably about 10 per cent. The liquid-liquid extracting operation carried out in the extract vessel 12 may be carried out between the temperatures of about 70° and 150° F., preferably between 125° and 130° F. Under these temperature and solvent to feed ratio conditions, there is produced a raffinate phase, containing substantially all of the n-heptane. This raffinate phase is withdrawn through the raffinate withdrawal line 13. From this raffinate phase is separated in the raffinate still 17 phenol containing moisture as still bottoms, while the n-heptane passes overhead through the vapor line 18. This vapor is condensed in condenser 19 and condensate passes through line 21 into accumulator 22. From this accumulator a portion of the condensate is withdrawn through line 23 and reintroduced into still 17 for refluxing purposes, while that condensate not needed for refluxing is withdrawn through the product line 20 and passed to storage or other disposal, not shown. This material passing through line 20 contains substantially the entire 50 pounds by weight of n-heptane of about 95 per cent purity.

The extract phase from the extractor 12 is removed through the extract line 15 and is cooled in the heat exchanger 29. This cooled extract phase is passed on through the line 30 into the chiller 31 in which the extract phase is cooled to a temperature of from about 35° to 40° F. At this temperature a considerable portion of the phenol separates as solid crystals of phenol. Sufficient of the phenol crystallizes to form a slurry high in solids content, and this slurry is transferred by the reciprocating piston 35 into the crystal purifier 39 by way of the conduit 38. Cooling medium for this crystallization operation is admitted to the chiller 31 through line 36 and is withdrawn therefrom by way of line 37. The piston 35 is reciprocated by the power means 32 as explained hereinbefore.

The crystal purifier 39 is operated in such a manner that the methylcyclohexane phase separated in cooler 31, along with some liquid phenol containing dissolved water and saturated with methylcyclohexane are withdrawn through the line 47 into the phase separator 48. The crystals of phenol entering the separator 39 are compressed and forced downward by each downward movement of the porous piston 41 in such a manner that liquid below the mass of crystals tends to rise upward through a mass of crystals, since the piston 41 is porous and permits liquid flow therethrough. At the same time some heat is provided by the heating coil 40 to melt the crystals of phenol reaching the region of the heating coil. A portion of this melted phenol flows through pipe 65 in the direction of pipe 28 and run tank 26 while some of the melted phenol flows upward through the bed of the remaining phenol crystals as the piston 41 is moved downward. During intervals in which the piston is moving upward, some additional charge stock is introduced into the separator 39 by the action of the reciprocating piston 35. Then upon addition of such an amount of charge material the piston 41 moves downward to compress the crystals and force some of the liquid phase upward between the crystals and through the piston and some of the melted phenol through the line 65. In this manner only melted phenol is passed through line 65 while substantially all of the water in solution in the phenol-rich liquid phase in the upper portion of purifier 39, along with the methylcyclohexane-rich phase are removed through the line 47. When these two liquid phases enter separator tank 48 they separate according to the specific gravities. The methylcyclohexane phase of course is the lighter phase and it floats on the surface of the relatively heavy phenol-rich phase. As mentioned hereinbefore, this phenol-rich phase is substantially a saturated solution of methylcyclohexane in phenol, which solution also contains substantially all of the water content leaving the purifier vessel 39. This phenol-rich phase then leaves this separator through the line 50 and is warmed in the exchanger 51 and is finally passed through line 52 into the still 53. This still 53 is the extract product still, in which only a relatively small volume of material is charged for distillation. Since water and methylcyclohexane boil at very nearly the same temperature these two materials pass overhead from still 53 as vapor through the line 54. This mixed vapor is condensed in the condenser 55 and condensate passes through the line 56, a portion being returned as reflux to the still through the line 57 and the remainder being passed through line 58 into the separator tank 59. In this tank the methylcyclohevane floats upon the surface of the condensed water, the former being removed at product line 60, while the water is passed through the line 61 to be combined with the bottoms from the still 53. The bottoms from the still 53 is substantially pure phenol and the mixture of phenol from line 63 and water from line 61 is passed through the line 67, is cooled in the exchanger 51 and passed on through the line 64. Phenol from the purifier 39 is added through line 65 and the mixture passed through line 28 into the run storage tank 26. Material entering the run storage tank 26 through line 25 and line 28 make up the solvent of desired composition for use in the solvent extraction operation. While the valved line 27 may be used for pressure reduction purposes in case pressure reduction is necessary, this line may also be used for introduction of makeup water when needed and for the introduction of phenol as needed. A valved line 44 is attached to line 61 as shown for removal of water from the solvent system as needed.

In the operation of the heating coil 40 in the bottom of the purifier vessel 39, sufficient temperature is maintained by coil 40 to melt the phenol crystals and heat the liquid leaving this vessel through line 65 to a temperature of about 100 to 115° F. In normal operation based upon the 1800 parts by weight of wet phenol per 100 parts by weight of charge stock charged to the extraction operation, there is melted by the heating coil 40 more than 700 to 800 parts by weight of phenol. This 700 to 800 parts by weight of phenol is passed through line 65 into line 28, while the excess melted phenol passes upward through the bed of phenol crystals as the porous piston 41 is moved downward. This portion of the melted phenol which passes upward through the bed of phenol crystals washes the crystals below the point of feed inlet so that the material leaving vessel 39 through line 65 will contain substantially no methylcyclohexane as a separate liquid phase. And further, this melted phenol in line 65 will contain substantially no methylcyclohexane in solution since this phenol originates entirely or substantially so from melting phenol crystals.

Since the phenol passing through line 65 is substantially pure phenol, and the phenol passing through line 63 is still bottoms, and the water passing through line 61 contains no hydrocarbon in solution, all of the recycled solvent components entering the run storage tank 26 are free from extract product and accordingly, no extract material is introduced with the extractant through line 14. In this manner the raffinate phase withdrawn through line 13 is maintained in a relative pure condition, free from contamination with extract material. The relatively small amount of phenol separated in the raffinate still 17 is usually free from extract material since it results from the distillation of the raffinate phase.

The kettle section of the still 53 is maintained at a temperature of from 360° to 375° F. by the addition of heat from the reboiler coil 62. In this manner the still bottoms are substantially pure phenol, while all other materials, that is, water and methylcyclohexane, are easily driven overhead.

Based upon the above mentioned amounts of charge stock and solvent charged to the extractor 12, the phenol-rich phase removed from the separator 48 and introduced into the still 53 consists of about 1000 parts by weight of phenol and water, and the 50 parts by weight of methylcyclohexane. By the removal of from 700 to 800 parts by weight of substantially pure phenol from the bottom of the purifier 39, which 700 to 800 parts by weight is nearly one-half of the phenol charged to the extractor 12, about one-half of the heat load requirement is saved in the operation of the extract recovery still 53.

This method of producing reflux material produces about 350 parts by weight of relatively pure methylcyclohexane in the phase separator 48, which reflux material is passed through the line 49, the heat exchanger 29, and on through line 16 to reflux the extract end of the extractor.

Wet phenol works exceptionally well according to the process of my invention, since the temperature in the crystallizer 31 needs to be only from 35° to 40° F. The maintenance of such a temperature is relatively inexpensive and is preferable to supplying additional heat for distillation in the extract recovery still 53.

The water and phenol mixture passing through line 67 contains about 18 per cent water based on the over-all 10 per cent water in the solvent entering the extractor 12.

While I have explained the operation of my process using wet phenol as the extraction solvent, other materials can be used as extractants. For example, o-cresol containing water in solution, p-cresol containing water in solution, xylenol (2,3-di-methylphenol) with water in solution, as well as levulinic acid containing water in solution may be used as extraction solvents.

When using these other materials as extraction solvents, the temperatures of crystallization in the crystallizer 31 will need to be somewhat different, dependent somewhat upon the melting point of the organic compound and upon its water content, and also upon the concentration of the extracted material in the solvent. While the above mentioned compounds are enumerated as useful in my process, mixtures of these materials may also be used, but it is preferable to use the individual compounds. A mixture of o-cresol and p-cresol serves as an example of a solvent mixture useful in my process. In like manner, such a material as phenyl phthalate in which water is not soluble may be used in the process of my invention. Phenyl phthalate melts at about 69° to 70° C. This material exhibits a miscibility temperature with n-heptane of 135° C., with 1-heptene of 79° C. and with cyclohexane of 41° C. Thus based on these miscibility temperatures, phenyl phthalate may be used in my process as an extraction solvent. When treating a mixture of these hydrocarbons at a temperature below 135° C. and above 79° C. 1-heptene and cyclohexane are extracted. When operating between 79° C. and 41° C. cyclohexane is extracted. Then cyclohexane may be separated from either or both of these materials as an extract phase and the 1-heptene may likewise be separated from the n-heptane. In these cases, cyclohexane and 1-heptene are produced, respectively, for refluxing purposes.

While I have explained the operation of my process using a phenol-water mixture as a solvent for the production of methylcyclohexane reflux in the separation of methylcyclohexane from admixture with n-heptane, this system is merely an example of the principle embodied in my invention. My process may be used in the separation of other hydrocarbon from other mixtures with the simultaneous marked reduction in the heat requirement in the extract recovery still.

A solvent to be useful according to this invention must possess a melting point higher than the feed materials to be separated so that the solvent can crystallize in the chiller 31 with the hydrocarbons present at this point remaining as liquid.

Materials of construction for the apparatus to be used may in general be selected from those commercially available, taking into account corrosive properties of any materials in the process.

While certain embodiments of the invention have been described for illustrative purposes, the invention is obviously not limited thereto.

I claim:

1. A solvent extraction operation comprising the steps of solvent extracting a liquid feed stock with a liquid selective solvent having a melting point higher than that of said feed stock to produce a raffinate phase and an extract phase, separating these phases, cooling the separated extract phase to its selective solvent crystallizing temperature to produce crystals of solid selective solvent, a first liquid phase comprising a saturated solution of extract material in selective solvent and a second liquid phase comprising extract material, returning this second liquid phase to the extraction operation as extract phase reflux and recovering extract material from said first liquid phase as a product of the process.

2. A process for separating methylcyclohexane from admixture with normal heptane comprising the steps of treating said admixture with phenol and water as a solvent under solvent extraction conditions to produce a raffinate phase comprising normal heptane and an extract phase comprising phenol, water and methylcyclohexane, withdrawing said raffinate phase as one product of the process, withdrawing said extract phase and cooling this phase to such a temperature to form crystals of phenol, a first liquid phase comprising aqueous phenol saturated with methylcyclohexane and a second liquid phase comprising methylcyclohexane, separating the so formed liquid phases from said crystals, separating the first and second liquid phases from one another, recovering methylcyclohexane from the separated first liquid phase as a second product of the process and returning the separated second liquid phase to the extraction operation at a point near the point of extract phase withdrawal as liquid reflux.

3. The process of claim 1 wherein the extractant is aqueous phenol.

4. The process of claim 1 wherein the extractant is an aqueous cresol.

5. The process of claim 4 wherein the cresol is ortho-cresol.

6. The process of claim 4 wherein the cresol is para-cresol.

7. The process of claim 1 wherein the extractant is aqueous 2,3-dimethyl phenol.

8. The process of claim 1 wherein the extractant is aqueous levulinic acid.

9. A process for separating methylcyclohexane from admixture with normal heptane comprising the steps of contacting said admixture with water containing phenol under solvent extraction conditions in an extraction zone to produce a raffinate phase and an extract phase, removing the raffinate phase from said zone, separating normal heptane from dissolved aqueous phenol of said raffinate phase, recovering the separated normal heptane as one product of the process and returning the separated aqueous phenol as a portion of the solvent to the extraction zone, removing the extract phase from said zone, cooling the removed extract phase to a temperature wherein crystals of phenol and two liquid phases are formed, separating the two liquid phases from the crystals of phenol, melting the latter and returning the same to the extraction zone as a second portion of extractant, from the two liquid phases separating a first liquid phase comprising aqueous phenol saturated with methylcyclohexane and a second liquid phase comprising methylcyclohexane, from said first liquid phase recovering methylcyclohexane as a second product of the process and returning the aqueous phenol as a further portion of the extraction solvent to said extraction operation, and returning said second liquid phase comprising methylcyclohexane to the extraction zone at a point near the point of extract phase withdrawal as reflux.

10. The process of claim 9 wherein the extraction operation is carried out at a temperature within the range of 70° to 150° F.

11. The process of claim 9 wherein the combined returned solvent contains from 5 to 15 per cent by weight water.

12. The process of claim 9 wherein the extraction operation is carried out at a temperature within the range of 70° to 150° F. and the combined solvent contains from 5 to 15 per cent water by weight.

13. The process of claim 12 wherein the extract phase is cooled to a temperature of 35° to 40° F. to precipitate said phenol crystals.

References Cited in the file of this patent

UNITED STATES PATENTS

| | | |
|---|---|---|
| 2,081,720 | Van Dijck | May 25, 1937 |
| 2,141,361 | Pilat et al. | Dec. 27, 1938 |
| 2,201,120 | Bosing | May 14, 1940 |
| 2,505,148 | Schneider | Apr. 25, 1950 |
| 2,557,406 | Blazer et al. | June 19, 1951 |
| 2,570,044 | Benedict et al. | Oct. 2, 1951 |